United States Patent
Mehring et al.

(10) Patent No.: US 10,445,684 B2
(45) Date of Patent: *Oct. 15, 2019

(54) ACTIVELY MANAGED FOOD DELIVERY

(71) Applicant: Intelleflex Corporation, San Jose, CA (US)

(72) Inventors: Peter A. Mehring, Los Altos, CA (US); Thomas C. Reese, Ellicott City, MD (US); Dean M. Kawaguchi, San Jose, CA (US); Sameer Dekate, Sunnyvale, CA (US); Russell Shikami, Cupertino, CA (US)

(73) Assignee: ZEST LABS, INC., San Jose, CA (US)

( * ) Notice: Subject to any disclaimer, the term of this patent is extended or adjusted under 35 U.S.C. 154(b) by 365 days.

This patent is subject to a terminal disclaimer.

(21) Appl. No.: 15/085,288

(22) Filed: Mar. 30, 2016

(65) Prior Publication Data

US 2016/0292634 A1   Oct. 6, 2016

Related U.S. Application Data

(60) Provisional application No. 62/140,425, filed on Mar. 30, 2015.

(51) Int. Cl.
*G06Q 30/00* (2012.01)
*G06Q 10/08* (2012.01)
*G06Q 50/12* (2012.01)

(52) U.S. Cl.
CPC ......... *G06Q 10/0832* (2013.01); *G06Q 50/12* (2013.01)

(58) Field of Classification Search
CPC ........................... G06Q 10/0832; A23B 7/148
See application file for complete search history.

(56) References Cited

U.S. PATENT DOCUMENTS

| | | | | |
|---|---|---|---|---|
| 5,658,607 | A | * | 8/1997 | Herdeman ............. A23B 7/148 426/263 |
| 6,433,313 | B1 | * | 8/2002 | Owens .................. A47J 47/145 219/387 |
| 6,536,189 | B1 | * | 3/2003 | Murray ................. B65B 25/001 53/440 |

(Continued)

OTHER PUBLICATIONS

Jedermann, R.; Praeger, U.; Geyer, M.; Lang, W.: Remote quality monitoring in the banana chain. In: Transactions of the Royal Society A, Theme issue: Intelligent Food Logistics, May/Jun. 2014, pp. 1-23 (Year: 2014).*

(Continued)

*Primary Examiner* — Brian M Epstein
(74) *Attorney, Agent, or Firm* — Zilka-Kotab, P.C.

(57) ABSTRACT

A method for managing a product delivery process, according to one embodiment, includes: receiving status information from one or more product containers, wherein the status information includes conditions of each of the one or more product containers; determining preferred ranges for the conditions of each of the one or more product containers based on a product stored in each of the one or more product containers; determining whether the received conditions from the one or more product containers are within the preferred ranges; and sending a command in response to determining that at least one of the received conditions is outside the determined preferred range.

14 Claims, 4 Drawing Sheets

(56) References Cited

U.S. PATENT DOCUMENTS

| | | | |
|---|---|---|---|
| 7,212,829 B1* | 5/2007 | Lau | G06Q 10/00 455/456.1 |
| 7,455,225 B1* | 11/2008 | Hadfield | G07C 5/085 235/384 |
| 2002/0099567 A1* | 7/2002 | Joao | G06Q 10/08 340/539.13 |
| 2007/0095905 A1* | 5/2007 | Kadaba | G06K 19/0717 235/384 |
| 2007/0254080 A1* | 11/2007 | Schackmuth | G06Q 10/06 426/523 |
| 2009/0251295 A1* | 10/2009 | Norair | G06K 19/0716 340/10.51 |
| 2010/0332407 A1* | 12/2010 | Grieve | G06Q 10/08 705/332 |
| 2011/0078089 A1* | 3/2011 | Hamm | G06Q 10/0833 705/333 |
| 2013/0214938 A1 | 8/2013 | Kim et al. | |
| 2014/0052412 A1 | 2/2014 | Kadaba | |
| 2014/0075572 A1 | 3/2014 | Mehring et al. | |
| 2014/0180953 A1* | 6/2014 | Westcott | A23B 7/152 705/332 |
| 2019/0213536 A1 | 7/2019 | Mehring et al. | |
| 2019/0213537 A1 | 7/2019 | Mehring et al. | |
| 2019/0220809 A1 | 7/2019 | Mehring et al. | |
| 2019/0220810 A1 | 7/2019 | Mehring et al. | |

OTHER PUBLICATIONS

International Search Report and Written Opinion from PCT Application No. PCT/US16/25068, dated Jun. 20, 2016.
Extended European Search Report from European Application No. 16774129.7, dated May 22, 2018.
Mehring et al., U.S. Appl. No. 16/360,942, filed Mar. 21, 2019.
Mehring et al., U.S. Appl. No. 16/361,029, filed Mar. 21, 2019.
Mehring et al., U.S. Appl. No. 16/361,070, filed Mar. 21, 2019.
Mehring et al., U.S. Appl. No. 16/361,042, filed Mar. 21, 2019.
Notice of Allowance from U.S. Appl. No. 16/361,070, dated May 13, 2019.

* cited by examiner

ACTIVELY MANAGED FOOD DELIVERY

RELATED APPLICATIONS

This application claims priority to U.S. Provisional Application No. 62/140,425, filed Mar. 30, 2015, which is herein incorporated by reference.

FIELD OF THE INVENTION

The present invention relates to product monitoring, and more particularly, this invention relates to improving the delivery environment and/or the process of delivering products.

BACKGROUND

The process of delivering products has become more complex as it has become increasingly time sensitive in many situations. This is particularly apparent for the delivery of perishable food products and/or prepared meals that may have an effective lifetime of no more than a few hours. Moreover, supply chains are being strained to meet shorter delivery times caused by the short effective lifetime of many products. It follows that, for companies shipping products that are sensitive to time, temperature, humidity, etc., or otherwise considered perishable products, there is a challenge in ensuring the products are managed properly, arrive in a desirable condition and within a defined delivery time. Furthermore, for companies receiving products that are sensitive to time, temperature, humidity, etc., or other perishable products, there is a need for ensuring the products being received have been handled properly, are in desirable condition and are within defined delivery times. Often the impact of mishandling is not visually apparent, and therefore invisible to the receiver without product condition monitoring throughout distribution.

However, even with product condition monitoring, those shipping products are currently unable to utilize product data collected during the shipping process until after the product has been delivered. Therefore, those shipping products may not realize that a shipment of perishable products has surpassed a product tolerance until after it has been delivered, e.g., after receipt, upon their inspection.

A method for managing a product delivery process, according to one embodiment, includes: receiving status information from one or more product containers, wherein the status information includes conditions of each of the one or more product containers; determining preferred ranges for the conditions of each of the one or more product containers based on a product stored in each of the one or more product containers; determining whether the received conditions from the one or more product containers are within the preferred ranges; and sending a command in response to determining that at least one of the received conditions is outside the determined preferred range.

A computer program product, according to another embodiment, includes: executable computer code embodied on a computer readable storage medium, the computer code including: computer code for receiving status information from one or more product containers, wherein the status information includes conditions of each of the one or more product containers; computer code for determining preferred ranges for the conditions of each of the one or more product containers based on a product stored in each of the one or more product containers; computer code for determining whether the received conditions from the one or more product containers are within the preferred ranges; and computer code for sending a command in response to determining that at least one of the received conditions is outside the determined preferred range.

A system, according to yet another embodiment, includes: a processor and logic integrated with and/or executable by the processor, the logic being configured to: receive, by the processor, status information from one or more product containers, wherein the status information includes conditions of each of the one or more product containers; determine, by the processor, preferred ranges for the conditions of each of the one or more product containers based on food product stored in each of the one or more product containers; determine, by the processor, whether the received conditions from the one or more product containers are within the preferred ranges; send, by the processor, a command in response to determining that at least one of the received conditions is outside the determined preferred range; receive, by the processor, food product history corresponding to the food products stored in the one or more product containers; use, by the processor, the food product history to determine a prioritized delivery scheme of the one or more product containers; send, by the processor, the prioritized delivery scheme to an individual transporting the one or more product containers; evaluate, by the processor, the food product history corresponding to the food products and/or the conditions of each of the one or more product containers; determine, by the processor, whether any of the food products are unsafe and/or undesirable; and send, by the processor, a command to not deliver certain food products in response to determining that they are unsafe and/or undesirable.

Other aspects and advantages of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of monitoring the delivery of products, and/or related systems and methods. Some of the embodiments described herein pertain to sensor-monitored processes which may be used to actively manage food delivery, e.g., to ensure quality and/or food safety regulations are met.

In one general embodiment, a method for managing a product delivery process includes: receiving status information from one or more product containers, wherein the status information includes conditions of each of the one or more product containers; determining preferred ranges for the conditions of each of the one or more product containers based on a product stored in each of the one or more product containers; determining whether the received conditions from the one or more product containers are within the preferred ranges; and sending a command in response to determining that at least one of the received conditions is outside the determined preferred range.

In another general embodiment, a computer program product includes: executable computer code embodied on a computer readable storage medium, the computer code including: computer code for receiving status information from one or more product containers, wherein the status information includes conditions of each of the one or more product containers; computer code for determining preferred ranges for the conditions of each of the one or more product containers based on a product stored in each of the one or more product containers; computer code for determining whether the received conditions from the one or more product containers are within the preferred ranges; and computer code for sending a command in response to determining that at least one of the received conditions is outside the determined preferred range.

In yet another general embodiment, a system includes: a processor and logic integrated with and/or executable by the processor, the logic being configured to: receive, by the processor, status information from one or more product containers, wherein the status information includes conditions of each of the one or more product containers; determine, by the processor, preferred ranges for the conditions of each of the one or more product containers based on food product stored in each of the one or more product containers; determine, by the processor, whether the received conditions from the one or more product containers are within the preferred ranges; send, by the processor, a command in response to determining that at least one of the received conditions is outside the determined preferred range; receive, by the processor, food product history corresponding to the food products stored in the one or more product containers; use, by the processor, the food product history to determine a prioritized delivery scheme of the one or more product containers; send, by the processor, the prioritized delivery scheme to an individual transporting the one or more product containers; evaluate, by the processor, the food product history corresponding to the food products and/or the conditions of each of the one or more product containers; determine, by the processor, whether any of the food products are unsafe and/or undesirable; and send, by the processor, a command to not deliver certain food products in response to determining that they are unsafe and/or undesirable.

Figure 1:
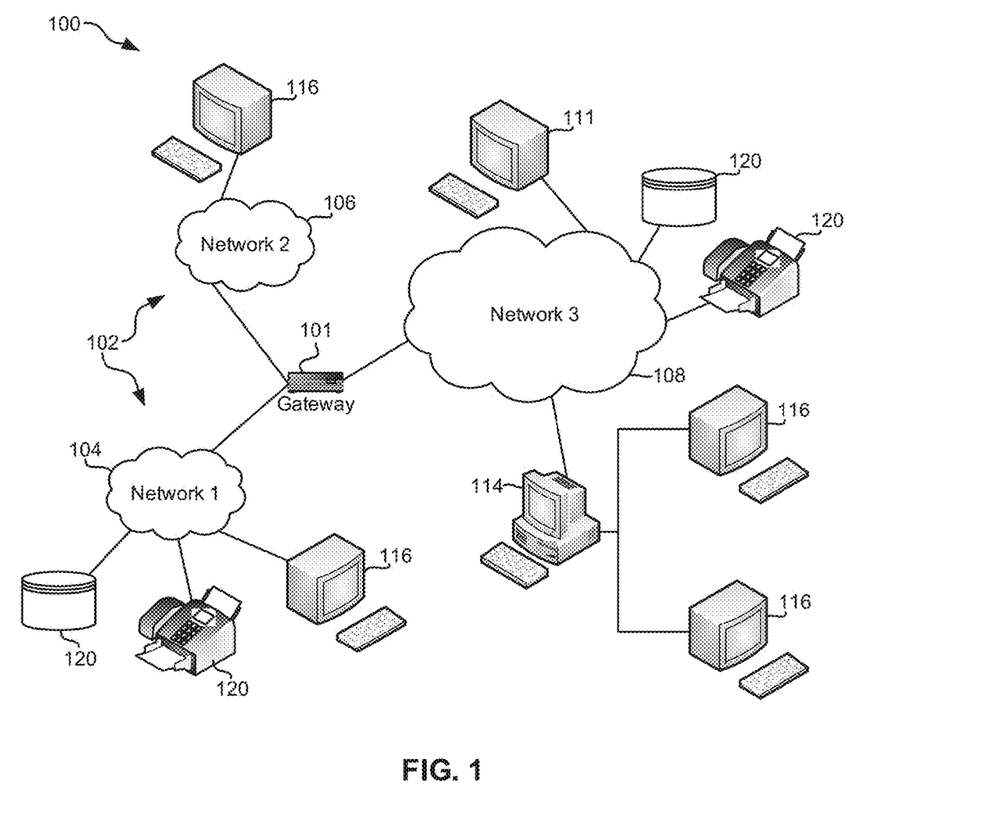
FIG. 1 is a network architecture, in accordance with one embodiment.

FIG. 1 illustrates an architecture 100, in accordance with one embodiment. As an option, the present architecture 100 may be implemented in conjunction with features from any other embodiment listed herein, such as those described with reference to the other FIGS. Of course, however, such architecture 100 and others presented herein may be used in various applications and/or in permutations which may or may not be specifically described in the illustrative embodiments listed herein. Further, the architecture 100 presented herein may be used in any desired environment.

As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, hand-held computer, printer or any other type of logic. It should be noted that a user device 111 may also be directly coupled to any of the networks, in one embodiment.

A peripheral 120 or series of peripherals 120, e.g. facsimile machines, printers, networked storage units, etc., may be coupled to one or more of the networks 104, 106, 108. It should be noted that databases, servers, and/or additional components may be utilized with, or integrated into, any type of network element coupled to the networks 104, 106, 108. In the context of the present description, a network element may refer to any component of a network.

In some embodiments, each of the peripherals 120 may include a mobile device, e.g., a mobile phone, a tablet, a laptop, etc., of a type known in the art. According to an in-use embodiment, which is in no way intended to limit the invention, the delivery container may include a wireless tag (e.g., a Bluetooth tag) and a microcontroller which enable the delivery container to wirelessly connect to one or more peripherals 120. As mentioned above, the peripherals 120 may include mobile phones of a type known in the art, which may be using any desirable operating system. Thus, the wireless tag and microcontroller may communicate with the one or more peripherals 120. Moreover, data received from the storage controller may be pushed by the peripherals 120 to a network Network 1 and/or Network 3, e.g., which may provide a Cloud service as described herein.

According to some approaches, methods and systems described herein may be implemented with and/or on virtual systems and/or systems which emulate one or more other systems, such as a UNIX system which emulates a MAC OS environment, a UNIX system which virtually hosts a MICROSOFT WINDOWS environment, a MICROSOFT WINDOWS system which emulates a MAC OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data processing and/or storage, servers, etc., are provided to any system in the cloud, preferably in an on-demand relationship, thereby allowing access and distribution of services across many computing systems. Cloud computing typically involves an Internet or other high speed connection (e.g., 4G LTE, fiber optic, etc.) between the systems operating in the cloud, but other techniques of connecting the systems may also be used.

Figure 2:
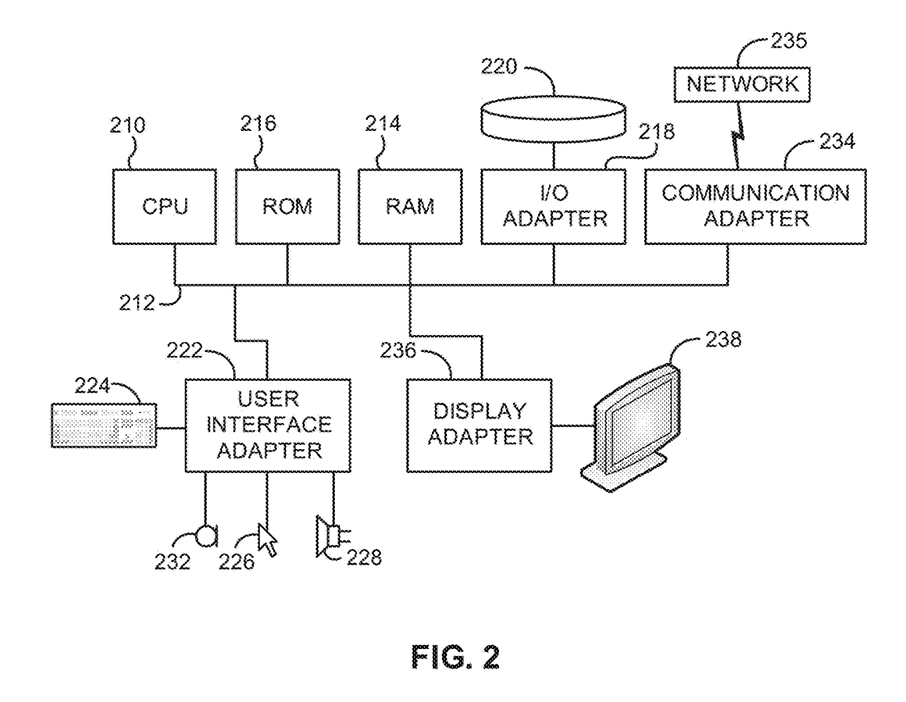
FIG. 2 is a representative hardware environment, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

In some embodiments, the workstation shown in FIG. 2 may be (or at least include) a mobile device, e.g., a mobile phone, a tablet, a laptop, etc., of a type known in the art. The mobile device may use any operating system which would be apparent to one skilled in the art upon reading the present embodiment, e.g., such as Android operating systems, iOS, etc., depending on the particular mobile device used.

Moreover, the workstation may have resident thereon an operating system such as the Microsoft WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

As mentioned above, supply chains are becoming more and more complex as products are shipped over longer distances and across international boundaries. For products that are sensitive to time, temperature, humidity, etc., or otherwise considered perishable products, there is a challenge in ensuring the products are managed properly, arrive in a desirable condition and within a defined delivery time. Often the impact of mishandling is not visually apparent, and therefore invisible to the receiver without product condition monitoring throughout distribution. Even with product condition monitoring, those shipping products are currently unable to utilize product data collected during the shipping process until after the product has been delivered. Therefore, those shipping products may not realize that a shipment of perishable products has surpassed a product tolerance until after it has been delivered, e.g., after receipt, upon their inspection.

In sharp contrast to the foregoing shortcomings, some of the embodiments described herein may include associating the control of a product container (also referred to herein as a delivery bag in some approaches) with a product profile. Moreover, the process of packaging, tracking, delivering, etc. the product container and/or products stored therein may be controlled from a centralized location. The centralized location may be connected to each of the product containers using a real-time analytic software application (e.g., using a Cloud-based network). According to an example, which is in no way intended to limit the invention, a product being transported in a product container may be a food item, e.g., being transported to or from a farms, supermarket, restaurant, intended consumer, etc. In some approaches, each food product may be associated with (e.g., assigned to) a profile that reflects the ideal operating parameters (e.g., delivery conditions which may vary over time) for the product container (e.g., delivery bag). In different approaches, the parameters may include a temperature in the product container, a relative humidity in the product container, whether the container is open or closed, a power status associated with the product container (e.g., when the product container has a powered mode of operation), shock and/or vibration experienced by the delivery container, a reference amount of time, etc., and/or other environmental conditions. It follows that the product container preferably maintains a delivery environment at least similar to the ideal operating parameters. In some approaches, the characteristics of the delivery environment may preferably be kept in respective ranges. For instance, the ambient temperature in the product container may preferably be kept between a maximum and minimum temperature. However, it should be noted that "in a range" is in no way intended to limit the invention. Rather than determining whether a value is in a range, equivalent determinations may be made, e.g., as to whether a value is within a above a threshold, whether a value is outside a predetermined range, whether an absolute value is above a threshold, whether a value is below a threshold, etc., depending on the desired approach.

Figure 3A:
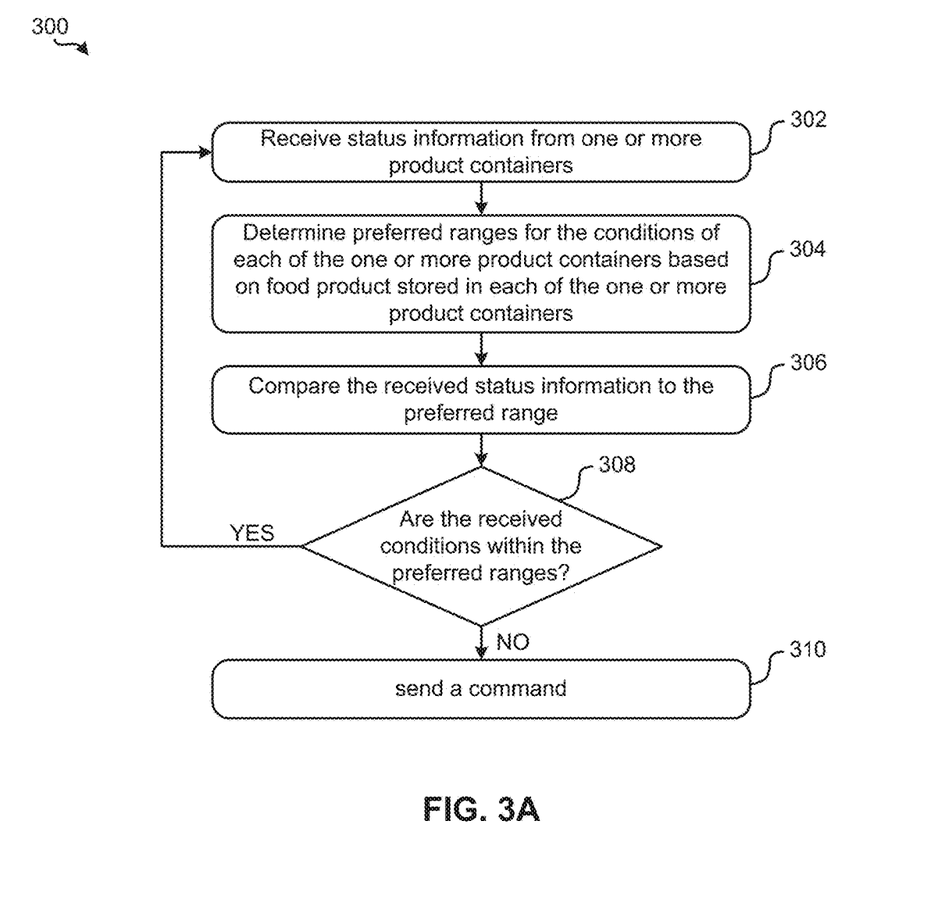
FIG. 3A is a flowchart of a method, in accordance with one embodiment.

Now referring to FIG. 3A, a flowchart of a method 300 for managing the delivery of products is shown according to one embodiment. The method 300 may be performed in accordance with the present invention in any of the environments depicted in FIGS. 1-2, among others, in various embodiments. Of course, more or less operations than those specifically described in FIG. 3A may be included in method 300, as would be understood by one of skill in the art upon reading the present descriptions.

Each of the steps of the method 300 may be performed by any suitable component of the operating environment. For example, in various embodiments, the method 300 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 3A, operation 302 of method 300 includes receiving status information from one or more product containers which may include products therein. The status information preferably includes conditions of each of the one or more product containers, e.g., such as an ambient temperature in the product container, a relative humidity in the product container, an amount of time spent in transit so far, etc., depending on the embodiment.

In some approaches, the product container may be a smart delivery container. A smart delivery container may include a bag, box, carton, etc., of known construction, also having environmental controls incorporated therewith. It follows that any one or more features disclosed herein may be implemented in different approaches, preferably in order to maintain desired operating parameters (e.g., ambient temperature in the delivery container).

Moreover, delivery containers may also be able to report current delivery conditions when possible, to the aforementioned centralized location. Thus, the status information received in operation 302 may come directly from the product containers. The product containers may include a component configured to transmit information, thereby enabling the product container to send status information to a centralized location (e.g., computer, control center, processor, etc.). In some approaches, a network as seen above in FIG. 1 (e.g., cloud-based network) may be used to transmit the information to the central location.

Referring still to FIG. 3, operation 304 includes determining preferred ranges for the conditions of each of the one or more product containers based on food product stored in each of the one or more product containers. However, as mentioned above, each food product may be associated with (e.g., assigned to) a profile that reflects the ideal delivery conditions for the product container (e.g., delivery bag), such as a temperature in the product container, a relative humidity in the product container, shock and/or vibration experienced by the delivery container, a reference amount of time, an amount of time since one or more products were put into one or more product containers, etc., and/or other environmental conditions. It follows that the product container preferably maintains a delivery environment at least similar to the ideal operating parameters. In some approaches, the characteristics of the delivery environment may preferably be kept in respective ranges. For instance, the ambient temperature in the product container may preferably be kept between a maximum and minimum temperature. However, it should be noted that "in a range" is in no way intended to limit the invention. Rather than determining whether a value is in a range, equivalent determinations may be made, e.g., as to whether a value is within a above a threshold, whether a value is outside a predetermined range, whether an absolute value is above a threshold, whether a value is below a threshold, etc., depending on the desired approach.

It should also be noted that the preferred ranges may change over time. In some approaches, a desired temperature range for a specific product may change over time. For instance, hot prepared meals may initially have a preferred temperature range which is relatively high, e.g., between about 160 degrees and about 165 degrees Fahrenheit. However, the preferred temperature range may reduce over time, e.g., to prevent the food from being overcooked. In some approaches, a preferred temperature range may reduce about 5 degrees Fahrenheit each hour, thereby preventing the food from being cooked while in transport.

In some approaches, a connected software application may be used to analyze the received current delivery conditions and/or produce results. Accordingly, operation 306 includes comparing the received status information to the preferred range determined in operation 304. However, in some approaches, preferred ranges may be predetermined (e.g., by a produce manufacturer, a user, a routing agent, etc.) and stored in memory for future use. Thus, preferred ranges may simply be retrieved from memory (e.g., a lookup table) in some approaches.

Looking now to decision 308, method 300 includes determining whether the received conditions from the one or more product containers are within the preferred ranges. Method 300 returns to operation 302 in response to determining that the received conditions from the one or more product containers are within the preferred ranges. Thus, updated (new) status information may be received from the same, additional, new, some, etc. of the product containers. It should be noted that in some approaches, any one or more of the processes of method 300 (and/or the other embodiments described herein) may be performed on a plurality of product containers. It follows that in some approaches, operation 302 may include receiving status information from a plurality of product containers which may include a plurality of different products or the same product.

However, method 300 proceeds to operation 310 in response to determining that the received conditions from the one or more product containers are not within the preferred ranges. As shown, operation 310 includes sending a command, which may vary depending on the embodiment. In some embodiments, the command sent in operation 310 may instruct an individual transporting the one or more product containers to perform a corrective (e.g., preventative) action. For example, in some approaches, the command may instruct a person driving a delivery truck carrying a plurality of product containers to turn on or off a heat source, such that the delivery environment is heated or cooled respectively.

In other embodiments, the command sent in operation 310 may adjust settings of an environmental control unit coupled to the one or more product containers. Thus, the aforementioned centralized location (e.g., computer, logistics office, routing center, automated control, etc.) may be able to actively adjust the conditions of the product containers and/or a shipping environment as a whole. For example, a controller may be able to automatically turn on an air conditioning unit in a delivery truck, turn on a heater in a product container, turn off a dehumidifier coupled to a product container, etc., in response to receiving a user request, automatically in response to determining that the conditions of one or more product containers are not within the preferred ranges, etc. In some approaches, a command which adjusts settings of an environmental control unit coupled to the one or more product containers may be sent in response to detecting inactivity by an individual to whom an initial command to perform a corrective action was sent. In other words, a command which adjusts settings of an environmental control unit coupled to the one or more product containers may be sent in response to the person driving the delivery truck carrying the product containers not performing the corrective action.

Figure 3B:
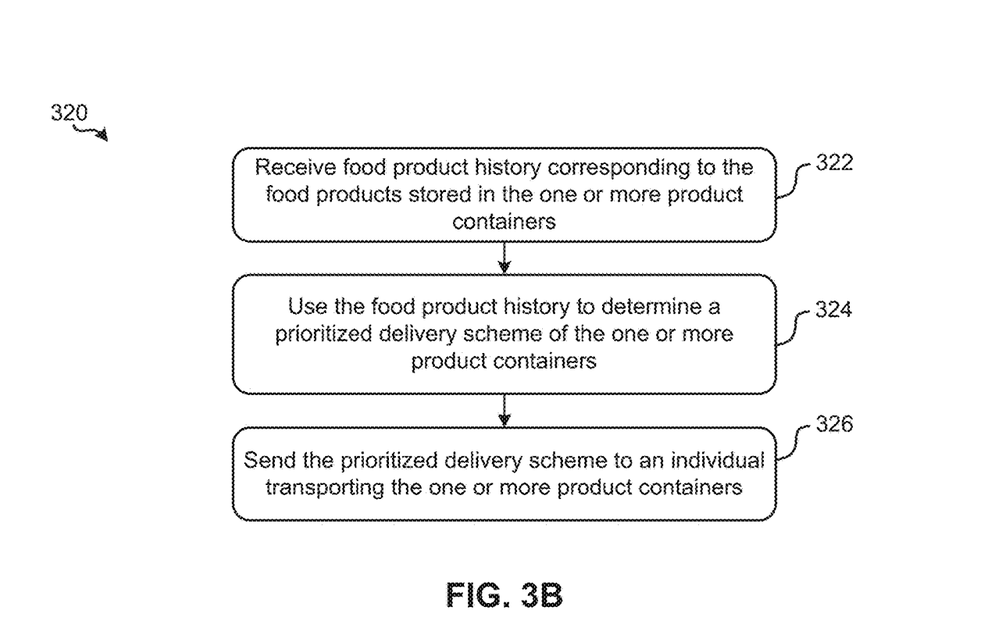
FIG. 3B is a flowchart of a method, in accordance with one embodiment.

Moreover, FIG. 3B illustrates another a flowchart of a method 320 for prioritizing a delivery scheme of food products according to one embodiment. The method 320 may be performed in accordance with the present invention in any of the environments depicted in FIGS. 1-3A, among others, in various embodiments. Of course, more or less operations than those specifically described in FIG. 3B may be included in method 320, as would be understood by one of skill in the art upon reading the present descriptions.

Each of the steps of the method 320 may be performed by any suitable component of the operating environment. For example, in various embodiments, the method 320 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 320. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 3B, operation 322 of method 320 includes receiving food product history corresponding to the food products stored in the one or more product containers. It should be noted that "food product history" may include past status information for a given food product. Moreover, in some approaches, the food product history may include ingredient freshness, an expiration date, preparation time, preparation conditions, storage time and/or condition, hand-off to delivery time, condition, relevant environmental parameter history, etc., depending on the desired embodiment.

As mentioned above, based on the results, the centralized software application may inform a person associated with the product container to take a corrective action, or directly control product containers which are "smart bags" having active environment elements which may be adjusted to achieve the desired environmental condition, e.g., such as turning on/off a heat source, venting the container, closing and/or opening a cover to the container, circulating the air, etc.

Moreover, operation 324 includes using the food product history to determine a prioritized delivery scheme of the one or more product containers. Method 320 additionally includes sending the prioritized delivery scheme to an individual transporting the one or more product containers. See operation 326. In other words, food item history may be used to prioritize availability in known areas and/or timeframes. However, in other approaches, the prioritized delivery scheme in operation 324 may be sent to a dispatcher who coordinates the delivery for various individuals transporting the one or more product containers, an intended delivery recipient, a business headquarters, other delivery personnel (who may be able to take over the delivery), etc., depending on the desired embodiment.

In some approaches, this may enable a delivery prioritization based on current freshness, maximizing food availability. For example, it is preferred to deliver food that is fresh and within quality parameters, but with the longest time since preparation first, ahead of food in similar condition prepared later. This may result because food which is prepared later will last longer, desirably providing a longer window of opportunity to sell and/or deliver.

Figure 3C:
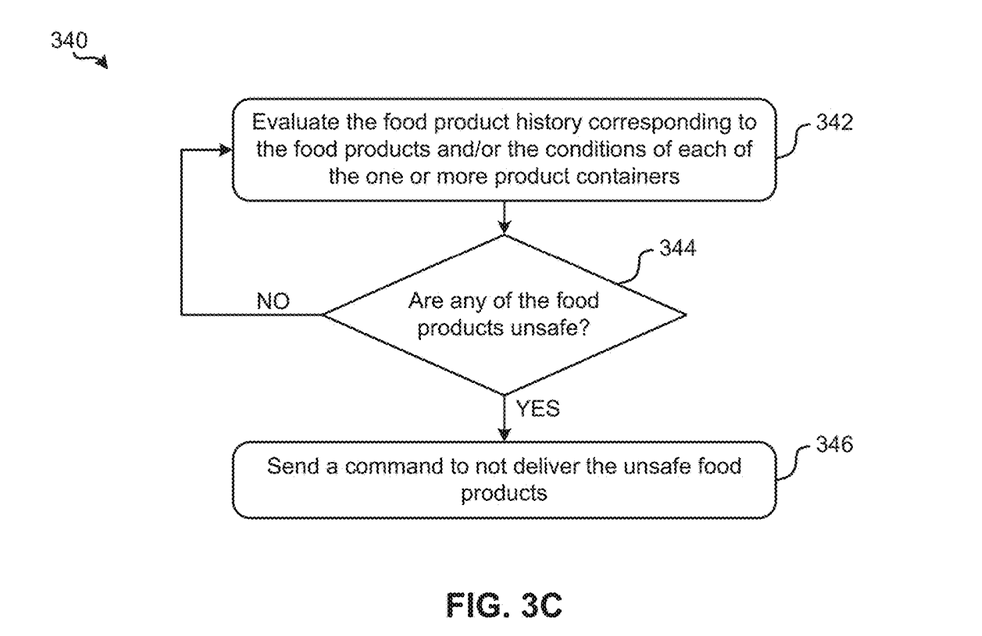
FIG. 3C is a flowchart of a method, in accordance with one embodiment.

FIG. 3C illustrates another a flowchart of a method 340 for prioritizing a delivery scheme of food products according to one embodiment. The method 340 may be performed in accordance with the present invention in any of the environments depicted in FIGS. 1-3B, among others, in various embodiments. Of course, more or less operations than those specifically described in FIG. 3C may be included in method 340, as would be understood by one of skill in the art upon reading the present descriptions.

Each of the steps of the method 340 may be performed by any suitable component of the operating environment. For example, in various embodiments, the method 340 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 340. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 3C, operation 342 of method 340 includes evaluating the food product history corresponding to the food products and/or the conditions of each of the one or more product containers. As previously mentioned, if the monitored results corresponding to a product container (e.g., smart delivery bag) are not within ideal parameters, preventative steps are preferably taken. In some approaches, instructions may be sent to a driver (e.g., a message sent to the driver's mobile device) with a corrective action. In other approaches, an adjustment command may be sent to an environmental control unit which automatically adjusts the settings of one or more product containers.

Furthermore, operation 344 includes determining whether any of the food products are unsafe (e.g., rotten, expired, rancid, infested, etc.) and/or undesirable. If one or more food items are deemed unsafe and/or undesirable, then the management system may notify food dispatcher to remove availability of the associated food in the corresponding product container (e.g., delivery bag) from availability, which may thereby effectively remove the corresponding food product(s) from delivery. Accordingly, method 340 proceeds to operation 346 in response to determining that any of the food products are unsafe and/or undesirable, where operation 346 includes sending a command to not deliver certain food products. The command in operation 346 may be sent to an operator (e.g., driver) of a vehicle transporting the products, a dispatcher who coordinates the delivery for various individuals transporting the one or more product containers, an intended delivery recipient, etc., depending on the desired embodiment. Alternatively, method 340 returns to operation 342 in response to determining that there are not any food products which are unsafe and/or unqualified, whereby the processes of method 340 may be repeated.

Further, any software used to enable the transaction, e.g., such as dispatching software that will send a delivery person to a customer, a sales transaction software that approves a customer payment, etc., may be notified to prevent the dispatching and/or selling of food deemed unqualified or unsafe for delivery and/or sale. This may automatically remove certain food products from availability, and does not require evaluation by the delivery person, who may not be sufficiently trained or motivated to determine if the food is of sufficient quality or safe. This is a food safety check, and an automated procedure that ensures proper food handling parameters may be maintained through delivery. It follows that this control feedback based on accumulated and current sensor data, an associated food profile, and/or connected to the transaction processing application software (e.g., either dispatching application or sales transaction) provide desirable processes which may be able to automatically ensure quality, and that safe food is delivered.

A benefit of actively managing the environment for food delivery beyond ensuring that the food quality and safety are maintained through delivery is that the time for delivery can be greatly extended. For example, an extended delivery time window may allow for the distance (e.g., or radius) of delivery to be extended when compared to traditional, non-managed food delivery. Moreover, advanced preparation of food may be made to have remote availability when demand occurs, thus dramatically shortening the delivery time compared to previous implementations. For instance, a typical delivery time is within 30 minutes where the food is maintained at proper temperature, whereas a smart delivery bag implementing one or more of the approaches described herein may be able to maintain the proper temperature for more than four hours, thereby greatly extending the time to deliver high quality food. Both of these aforementioned benefits add direct value to the customer, as they make delivered food available in locations that would not be met by non-managed food delivery, as well as enabling prepared and staged food to be available for very short delivery times. This results in making an essentially on-demand food deliver system possible. These customer benefits can increase demand for the food supplier, and therefore increase business. In each case, it is desirable that the food is maintained in the proper condition.

One illustrative implementation, which is in no way intended to limit the invention, uses a custom-built delivery bag that incorporates a sensor tag in the heating tray, which is a controllable heating unit, and which may optionally support freeze packs to maintain cold, as well as hot, temperatures. The sensor tag contains a temperature sensor, and line voltage sensor for the 12V DC supply voltage (e.g., for use in a car), and a controlled switch for the heating unit. There is an optional external light sensor that can be mounted to detect when the delivery bag is open (light sensed) or closed (no light sensed). The temperature and supply voltage may be monitored at any desired frequency (e.g., once a minute) by polling the sensors. However, the light sensor may be continually monitored (e.g., on an interrupt basis). All of the sensor information is preferably "published" to a Cloud-based application on a configured interval. The delivery bag sensor tag will push the data via its wireless (e.g., Bluetooth, wifi, radio frequency identification, etc.) communication port, which has been paired to the driver's mobile phone. However, in some approaches a wired (physical) connection may be used, e.g., such as an Ethernet cable, a wire, a bus, etc. The mobile phone may be running an application that accepts the wireless communication, adds a local timestamp and/or GPS location information, and pushes the total message to the management system cloud application. The management system receives the information in its incoming message queue, and may immediately analyze the sensor readings against parameters based on the product profile associated with the tag ID at the beginning of the shift. At the beginning of each shift, the supplier will associated each bag ID), which has a one-to-one correlation to a sensor tag ID, with a product profile associated with the type of product loaded in the delivery bag for that shift. The management system captures the delivery bag load time and location, the product profile associated with the specific bag ID and the shift, and any product data that is shift specific, such as condition of product when prepared, from which it determines the delivery bag parameters for the current shift. For instance, if a hot meal (e.g., chicken teriyaki rice bowl) is prepared with ingredients cooked within 30 minutes of loading the delivery bag, the parameters may be set to maintain a bag temperature of at least 145 F, and no more than 165 F, and the food will be available for four hours from loading. If the bag temperature is below the 145 F, it may degrade the time available in relation to how low the temperature is, and for how long the low temperature is maintained (e.g., change in temperature over change in time). There may also be predetermined minimum temperature to disqualify the food, e.g., when it becomes unsafe. The management system will monitor the time, temperature, supply voltage, bag light sensor, etc., to determine if the food is being properly maintained.

When the management system detects a low supply voltage for a preconfigured amount of time, it will send an alert to the driver, reflecting that the delivery bag is unpowered. If the management system detects that the light sensor is activated for a continuous time beyond a preconfigured interval, it may notify the driver that the bag has been left open. Driver notifications can be sent to the mobile device that acts as the communication bridge from the sensor tag to the management system, or any mobile device associated with the bag ID. Notifications are "pushed" events, and can take many forms, including an application notification, and SMS message, or a web page update. In other approaches, a warning may simply be sent. For example, an audible warning sound may be played on a speaker in the delivery truck, a warning light may flash in the delivery truck storage bay, a warning may be displayed on the navigation system of the delivery truck, etc. The driver may optionally acknowledge the message, which the management system will record with the time and location of the response, as well as the current sensor tag readings. The management system may also set the heating parameters for the sensor tag in the delivery bag, such that the sensor tag will control the heater to be on or off to maintain the appropriate bag temperature. For instance, the sensor tag heater controller may turn the heater on until the temperature reaches the maximum temperature allowed based on the product profile, and then turn the heater off until the food reaches an ideal bag temperature parameter. In each of these ways, the management system helps the delivery bag driver maintain the ideal temperature in the delivery bag.

The management system further sends updates to other applications that may be used to dispatch the driver to a customer, or complete a sales transaction with a customer. The management system maintains a product freshness metric that tracks the product from ideal freshness to disqualification. Based on this metric, the dispatch application may select the best choice for delivery from two or more delivery bags qualified for delivery. By selecting the delivery bag with the lower freshness metric, the dispatch application will maintain an inventory of food with a higher freshness metric, thereby extending the available time window for food delivery. This is made possible by monitoring the handling of each delivery bag, and calculating the freshness metric according to the actual sensor data, the product profile, and any product data that is shift specific (e.g., see methods 300, 320, 340 above).

The management system also sends updates, pushes based on events, based on the product in the delivery bag being appropriate for sale. If the management system determines the product has been disqualified, possibly due to mishandling or the expiration of the allowable time window, the management system will notify the sales transaction application to remove the product in the specific delivery bag from availability. There may also be user input to disqualify one or more delivery bag contents, such as in a recall. This enables immediate action to prevent further sales of product for any reason. The management system may optionally notify other applications or users of this disqualification status, for instance the management system notifies the driver of the product disqualification and requests they acknowledge and return the product to the supplier for proper disposal.

The management system stores all of the data associated with each shift and delivery bag. This data can be used to analyze the performance of the entities involved in each delivery, and report accordingly. For instance, data could show that specific drivers consistently mishandle the food, or that a certain restaurant does not load the food at the appropriate temperature. These types of analytical reports can help improve the food delivery over time. The data can also be used for health department or other food safety reports, to reflect that proper process that maintains food quality and safety is being adhered to on a consistent basis.

A separate benefit to having a sensor tag in each delivery bag is that the management system can manage the bag as an asset, and improve asset utilization. The management system does this by tracking which driver has each delivery bag, and if they do not return by the specified time, remind the driver and notify the appropriate operations application or person. This helps keep the maximum number of bags in active use, and thereby reduces the total number of delivery bags needed for a specific operation, maximizing value.

According to another in-use embodiment, which is in no way intended to limit the invention, a delivery bag may be pre-loaded with a meal profile associated with a meal that is to be transported in the delivery bag. The meal profile may outline a desired delivery bag environment to maintain for the food being transported therein. The meal profile may be pre-loaded as part of a meal preparation procedure, e.g., which may include pre-heating or pre-cooling the delivery bag. After the meal profile has been loaded, the delivery bag may autonomously maintain the desired delivery bag environment. This may be achieved by using a controller coupled to the delivery bag to monitor the environment settings at least in the delivery bag. Moreover, the controller may adjust the environment settings as needed by turning on or off a heater, turning on or off an air conditioner, opening or closing a vent, turning on or off a dehumidifier, etc. The delivery bag may also regularly report the current bag conditions, e.g., using an antenna, to a Cloud network, via a connection to a mobile phone. The delivery bag may not always have sufficient resources (e.g., power, capabilities, etc.) to manage the environment inside the delivery bag. As a result, the ability to affect the delivery bag environment may be limited. In some approaches, the Bluetooth controller may be coupled to an independent battery, preferably such that the delivery environment status may be sent regardless of the amount of power that is otherwise available. The Cloud network may notify a dispatcher and/or a driver of any corrective actions which should be performed, and may help determine dispatch priority by comparing conditions over multiple delivery bags.

Features from an illustrative management system disclosed in U.S. patent application Ser. No. 14/014,173 filed Aug. 29, 2013 to Mehring et al., which is herein incorporated by reference, may be used in various embodiments disclosed herein.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

The description herein is presented to enable any person skilled in the art to make and use the invention and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

In particular, various embodiments of the invention discussed herein are implemented using the Internet as a means of communicating among a plurality of computer systems. One skilled in the art will recognize that the present invention is not limited to the use of the Internet as a communication medium and that alternative methods of the invention may accommodate the use of a private intranet, a Local Area Network (LAN), a Wide Area Network (WAN) or other means of communication. In addition, various combinations of wired, wireless (e.g., radio frequency) and optical communication links may be utilized.

The program environment in which one embodiment of the invention may be executed illustratively incorporates one or more general-purpose computers or special-purpose devices such hand-held computers. Details of such devices (e.g., processor, memory, data storage, input and output devices) are well known and are omitted for the sake of clarity.

It should also be understood that the techniques of the present invention might be implemented using a variety of technologies. For example, the methods described herein may be implemented in software running on a computer system, or implemented in hardware utilizing one or more processors and logic (hardware and/or software) for performing operations of the method, application specific integrated circuits, programmable logic devices such as Field Programmable Gate Arrays (FPGAs), and/or various combinations thereof. In one illustrative approach, methods described herein may be implemented by a series of computer-executable instructions residing on a storage medium such as a physical (e.g., non-transitory) computer-readable medium. In addition, although specific embodiments of the invention may employ object-oriented software programming concepts, the invention is not so limited and is easily adapted to employ other forms of directing the operation of a computer.

The invention can also be provided in the form of a computer program product comprising a computer readable storage or signal medium having computer code thereon, which may be executed by a computing device (e.g., a processor) and/or system. A computer readable storage medium can include any medium capable of storing computer code thereon for use by a computing device or system, including optical media such as read only and writeable CD and DVD, magnetic memory or medium (e.g., hard disk drive, tape), semiconductor memory (e.g., FLASH memory and other portable memory cards, etc.), firmware encoded in a chip, etc.

A computer readable signal medium is one that does not fit within the aforementioned storage medium class. For example, illustrative computer readable signal media communicate or otherwise transfer transitory signals within a system, between systems e.g., via a physical or virtual network, etc.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A computer-implemented method for managing a product delivery process, comprising:
   receiving, by a computer, status information from one or more product containers, wherein the status information includes conditions of each of the one or more product containers;
   determining, by the computer, preferred ranges for the conditions of each of the one or more product containers based on a product stored in each of the one or more product containers, wherein the preferred ranges change over time by a predefined amount per unit time, wherein the predefined amount and the unit time are specified in a profile associated with the product stored in each of the one or more product containers;
   determining, by the computer, whether the received conditions from the one or more product containers are within the preferred ranges; and
   sending, by the computer, a command to an environmental control unit coupled to the one or more product containers in response to determining that at least one of the received conditions is outside the determined preferred range,
   wherein the environmental control unit is configured to adjust the at least one condition of the one or more product containers in response to receiving the command.

2. The method as recited in claim 1, wherein the conditions of the product container include at least one of: an ambient temperature in the product container, a relative humidity in the product container, whether the product container is open or closed, and a power status associated with the product container.

3. The method as recited in claim 1, wherein at least one of the product containers is a bag having a light sensor, and comprising receiving sensor information from the light sensor indicating that the bag is open; and sending a notification in response to receiving the sensor information from the light sensor indicating that the bag is open.

4. The method as recited in claim 1, wherein the product is a food product, wherein a plurality of the food products are stored in the one or more product containers, at least one of the products being predestined for a first destination that is different than a second destination of another of the products.

5. The method as recited in claim 4, comprising:
   receiving, by the computer, food product history corresponding to the food products stored in the one or more product containers;
   using, by the computer, the food product history to determine a prioritized delivery scheme of the one or more product containers; and
   sending, by the computer, the prioritized delivery scheme to an individual transporting the one or more product containers, and/or to a dispatcher.

6. The method as recited in claim 5, comprising:
   evaluating, by the computer, the food product history corresponding to the food products and/or the conditions of each of the one or more product containers;
   determining, by the computer, whether any of the food products are unsafe and/or undesirable; and
   sending, by the computer, a command to not deliver certain food products in response to determining that they are unsafe and/or undesirable.

7. A computer program product, comprising:
   executable computer code embodied on a computer readable storage medium, the computer code including:
   computer code for receiving status information from one or more product containers, wherein the status information includes conditions of each of the one or more product containers;
   computer code for determining preferred ranges for the conditions of each of the one or more product containers based on a product stored in each of the one or more product containers, wherein the preferred ranges change over time by a predefined amount per unit time, wherein the predefined amount and the unit time are specified in a profile associated with the product stored in each of the one or more product containers;
   computer code for determining whether the received conditions from the one or more product containers are within the preferred ranges; and
   computer code for sending a command to an environmental control unit coupled to the one or more product containers in response to determining that at least one of the received conditions is outside the determined preferred range,
   wherein the environmental control unit is configured to adjust the at least one condition of the one or more product containers in response to receiving the command.

8. The computer program product as recited in claim 7, wherein the conditions of the product container include at least one of: an ambient temperature in the product container, a relative humidity in the product container, whether the product container is open or closed, and a power status associated with the product container.

9. The computer program product as recited in claim 7, comprising computer code for receiving food product history corresponding to the products stored in the one or more product containers, wherein the food product history includes information selected from the group consisting of: ingredient freshness, an expiration date, preparation time, preparation conditions, and hand-off to delivery time.

10. The computer program product as recited in claim 7, wherein a plurality of the products are stored in the one or more product containers, at least one of the products being predestined for a first destination that is different than a second destination of another of the products, wherein the products are food products, wherein the food product with the longest time since preparation is prioritized for delivery ahead of another of the food products prepared later.

11. The computer program product as recited in claim 10, comprising:
    computer code for evaluating the food product history corresponding to the food products and/or the conditions of each of the one or more product containers;
    computer code for determining whether any of the food products are unsafe and/or undesirable; and
    computer code for sending a command to not deliver certain food products in response to determining that they are unsafe.

12. A system, comprising:
    a processor and logic integrated with and/or executable by the processor, the logic being configured to:
    receive, by the processor, status information from one or more product containers, wherein the status information includes conditions of each of the one or more product containers;
    determine, by the processor, preferred ranges for the conditions of each of the one or more product containers based on food products stored in the one or more product containers, wherein the preferred ranges change over time by a predefined amount per unit time, wherein the predefined amount and the unit time are specified in a profile associated with the products stored in the one or more product containers;

determine, by the processor, whether the received conditions from the one or more product containers are within the preferred ranges; and send, by the processor, a command to an environmental control unit coupled to the one or more product containers in response to determining that at least one of the received conditions is outside the determined preferred range, wherein the environmental control unit is configured to adjust the at least one condition of the one or more product containers in response to receiving the command.

13. The system as recited in claim 12, wherein the conditions of the product container include at least one of: an ambient temperature in the product container, a relative humidity in the product container, whether the product container is open or closed, and a power status associated with the product container, wherein the status information is received from a plurality of product containers, wherein the food product history includes information selected from the group consisting of: ingredient freshness, an expiration date, preparation time, preparation conditions, and hand-off to delivery time.

14. A computer-implemented method, comprising:
receiving, by the computer, status information from one or more product containers, wherein the status information includes conditions of each of the one or more product containers;

determining, by the computer, preferred ranges for the conditions of each of the one or more product containers based on food products stored in the one or more product containers, wherein the preferred ranges change over time by a predefined amount per unit time, wherein the predefined amount and the unit time are specified in a profile associated with the products stored in the one or more product containers;

determining, by the computer, whether the received conditions from the one or more product containers are within the preferred ranges;

sending, by the computer, a command to an environmental control unit coupled to the one or more product containers in response to determining that at least one of the received conditions is outside the determined preferred range, wherein the environmental control unit is configured to adjust the at least one condition of the one or more product containers in response to receiving the command;

receiving, by the computer, food product history corresponding to the food products stored in the one or more product containers;

using, by the computer, the food product history to determine a prioritized delivery scheme of the one or more product containers, wherein the food product with the longest time since preparation is prioritized for delivery ahead of another of the food products prepared later;

sending, by the computer, the prioritized delivery scheme to an individual transporting the one or more product containers;

evaluating, by the computer, the food product history corresponding to the food products and/or the conditions of each of the one or more product containers;

determining, by the computer, whether any of the food products are unsafe and/or undesirable; and sending, by the computer, a command to not deliver certain food products in response to determining that they are unsafe and/or undesirable.

* * * * *